Jan. 6, 1959     L. PERAS     2,867,080
DRIVING MECHANISM FOR AUXILIARY APPARATUSES
Filed Sept. 24, 1956
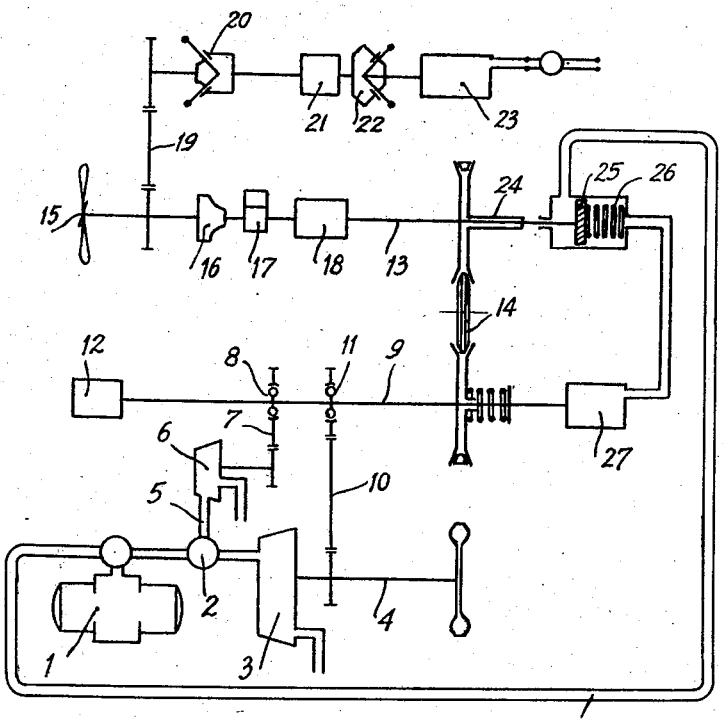
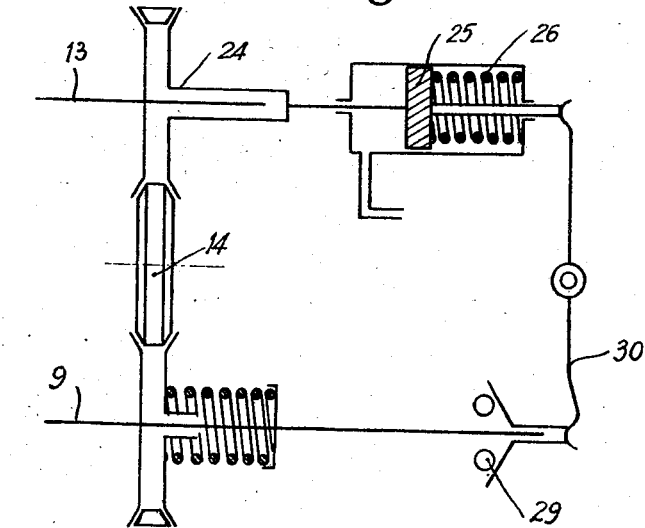

United States Patent Office 2,867,080
Patented Jan. 6, 1959

2,867,080

DRIVING MECHANISM FOR AUXILIARY APPARATUSES

Lucien Peras, Billancourt, France, assignor to Regie Nationale des Usines Renault, Billancourt, France Application September 24, 1956, Serial No. 611,526

Claims priority, application France September 26, 1955

7 Claims. (Cl. 60—13)

This invention relates to the driving of the auxiliary apparatuses (fan, water and oil pumps, electric generator, air compressor and so on) on a vehicle, the driving equipment of which is constituted by a free-piston gas generator feeding a turbine.

It is known that in such an installation the driving turbine is connected to the propulsive means of the vehicle and in consequence runs at zero or reduced speed when the vehicle is at a standstill or running slowly. At this time and even in the case of a vehicle at a standstill when this is to be of short duration, the gas generator operates at its no-load running speed, which is relatively high and necessitates that the circulation and cooling of the water be maintained. It is furthermore desirable that other apparatuses, such as the generator feeding the accumulator and the compressor feeding the braking tank, should continue to function. The power required for driving the auxiliary apparatuses cannot, in these running conditions, be taken from a shaft connected to the turbine shaft, the speed of rotation of which is inadequate. Nor can it conveniently be taken from the generator, which does not have an appropriate turning shaft.

Moreover, it is known that, contrary to what happens in the case of a conventional piston-type heat engine, the quantity of heat to be carried off to ensure cooling of the generator is not approximately proportional either to the speed of rotation of the driving turbine or to the stroke rhythm of the generator. It follows that if the auxiliaries carrying out the cooling (the fan and the water pump) were to be driven at a speed of rotation proportional to that of one or other of these two elements, they would have to be dimensioned so as to ensure sufficient cooling under full power running conditions of the generator and low speeds of the vehicle, and would in consequence be over-dimensioned, with the drawback of wasteful power consumption at the partial loads on the generator and at the relatively high speeds of the driving turbine which are precisely the runnng conditions most frequently encountered on a vehicle.

According to the present invention, which will now be described with reference to the accompanying figures, the auxiliary apparatuses are driven by a shaft which is connected to the shaft of the turbine when the speed of the vehicle is adequate and which is driven by a special turbine when the speed of the vehicle is inadequate and when the generator is running on no load.

Figure 1 is a diagram of the drive assembly for the auxiliaries.

Figure 2 is a modification of the speed regulating device.

In the accompanying Figure 1, reference 1 is the free-piston generator which, through the medium of the valve 2, feeds the driving turbine 3, the shaft 4 of which is connected to the propulsive means of the vehicle.

The valve 2 is so disposed as to direct towards the turbine 3 the gases produced by the generator 1 when the turbine has to deliver power. On the other hand, it is arranged in such manner as to deliver said gases to the atmosphere through a pipeline 5, when the generator is running on no load.

In the device according to the invention, the gases circulating in the pipeline 5 pass, before emerging into the atmosphere, through an auxiliary turbine 6, the shaft of which drives the main driving shaft 9 for the auxiliaries through the medium of any transmission 7 and a free wheel 8.

Said shaft 9 is also joined by any transmission 10 and a free wheel 11 to the shaft 4 of the driving turbine, the two transmissions 7 and 10 and the two free wheels 8 and 11 being arranged for drive in the same direction of rotation.

The shaft 9 can drive certain auxiliary apparatuses such as 12, the speed of rotation of which can, without disadvantage, be any desired or at least vary between wide limits.

Moreover, the shaft 9 is connected to another shaft 13 through the medium of a continuous change-speed device 14, represented in the figure in the well-known form of a change-speed device of the type having a trapezoidal belt and extensible pulleys.

The shaft 13 drives auxiliary apparatuses such as the fan 15, the cooling water pump 16, the oil pump 17, the electric generator 18, and so on, the speed of which is advantageously kept between relatively narrow limits.

Furthermore, a constant-ratio transmission 19 drives, from the shaft 13 and through the medium of a centrifugal clutch 20, the air compressor 21 which can further be driven, preferably but not necessarily, through the medium of another centrifugal clutch 22, by an electric motor of the vehicle.

The transmission ratio of the change-speed device 14 is controlled by a regulating mechanism influenced on the one hand by the speed of the vehicle and on the other hand by the working pressure of the generator. In the example selected and shown in Figure 1, the movable flange 24 of the driven extensible pulley mounted on the shaft 13 is moved axially by a piston 25 which is subjected, on its right-hand face, to the action of a spring 26 and to the pressure of a fluid delivered by a pump 27 driven by the shaft 9, the speed of which is in consequence linked to the speed of the vehicle when the latter is in normal operation.

The piston 25 is subjected, on its left-hand face, to a fluid pressure proportional to the working pressure of the generator, transmitted through a pipeline 28.

In Figure 2, the shaft 9 carries a centrifugal governor 29 exerting on one of the ends of a lever 30 a force which is a function of the speed of rotation of the shaft. The lever 30 transmits to the piston head 25 a force which will be added to that of the spring 26 and which increases in the same direction as the speed of rotation of the shaft 9.

The operation of the device is as follows:

When the vehicle is stopped or moves at a very low speed, the shaft 4 of the driving turbine rotates at a speed inadequate to ensure suitable driving of the auxiliary apparatuses. On the other hand, the valve 2 is so arranged as to deliver the greater part or all of the gases delivered by the generator 1, which is running under no load, to the pipeline 5 and in consequence to the turbine 6, which is then capable of delivering the power required to drive auxiliary apparatuses. This power is communicated to the shaft 9 by the transmission 7 and the free wheel 8 and directly ensures rotation of the apparatuses such as 12. The free wheel 11 is then in the unlocked position and does not prevent rotation of the shaft 9.

Under the above described operating conditions, the working pressure of the generator is at the minimum, so that under the influence of the spring 26 and of the delivery of the pump 27 the piston 25 and the flange 24 are kept towards the left-hand end of their travel and the change-speed device 14 is in its maximum reduction position. The transmission ratio 7 is selected in such manner that the auxiliary apparatuses are then driven at the desired speed to ensure operation of the auxiliaries required in these operating conditions.

When the vehicle is in normal operation, the valve 2 directs the entire output of the gases of the generator 1 to the driving turbine 3, so that the turbine 6, no longer being fed, is stopped together with the transmission 7, the free wheel 8 of which assumes the unlocked position and does not prevent rotation of the shaft 9, which is then driven by the shaft 4 of the driving turbine through the medium of the transmission 10 and of the free wheel 11 in the locked position.

The vehicle running at the maximum speed with the maximum working pressure of the generator, the piston 25 is still kept at the left-hand end of its stroke, the force of the spring 26 and the action of the delivery pressure of the pump 27 then being exactly balanced by the action of the working pressure of the generator transmitted through the pipeline 28. The change-speed device 14 is here again in its maximum reduction position; the value of this reduction and the ratio of the transmission 10 are selected in such manner that the auxiliary apparatuses are driven at the minimum speed suitable for the full speed and full power running conditions, and particularly for the carrying off of the heat transmitted by the generator to its cooling water.

If the vehicle, still at the maximum working pressure, slows down, for example when approaching a hill, the pressure of the pump 27 linked to the speed of the vehicle will reduce and the balance of the piston 25 will be broken, the action of the working pressure on its left-hand face becoming predominant and moving the piston 25 and the bearing flange 24 towards the right. The transmission 14 will then function with a higher ratio and the speed of the shaft 13 will not reduce like the speed of the vehicle. By a judicious selection of the different parameters of the mechanism, the speed of the shaft 13 can be kept substantially constant for one and the same value of the working pressure, at least for as long as the piston 25 is not at the end of the right-hand stroke and as long as in consequence the change-speed device 14 has not attained its maximum step-up position.

If, on the other hand, for a given speed, the power to be delivered and, in consequence, the working pressure decrease, the action of said pressure on the left-hand face of the piston 25 will become less than the combined action of the spring 26 and of the delivery pressure of the pump 27 linked to the speed of the vehicle. The piston 25 will move to the left and drive the flange 24, and consequently will put the change-speed device 14 into a more reduced position, thus lowering the speed of rotation of the auxiliary apparatuses driven by the shaft 13.

It will be seen from the foregoing description that while the generator operates at full power the fan and the water pump effecting its cooling are kept at the speed desired to ensure the carrying off of the heat transmitted to the cooling water, even if the speed of the vehicle varies in wide proportions during this operation at full power. When, on the other hand, the generator delivers only part of its power, the driving speed of the fan and of the water pump, which then have to carry off only a smaller quantity of heat, is reduced in consequence. The electric generator and the braking air compressor are advantageously driven in the same conditions as the fan and the water pump, this having the advantage of reducing the speed divergences to which they are subjected in operation.

In the particular case of the braking air compressor, which must be capable of being used when the vehicle and even the generator are stopped, the assembly of the mechanism the operation of which was described above being immobile in consequence, the centrifugal clutch 20 which is then in the disengaged position gives it freedom to turn, driven by the motor 23. To prevent the latter from continuing to run uselessly when the generator is working, it is connected to the compressor by the other centrifugal clutch 22 only when it is put in motion and remains separated from it when it is stopped.

It will be understood that the construction of the speed-change device 14 and of its control as shown in Figure 1 and as described hereinabove constitutes only one example and that, without departing from the scope of the invention, the change-speed device with the trapezoidal belt and extensible pulleys could be replaced by any other known type of continuous change-speed device.

Regarding the control of the transmission ratio of said change-speed device, the action of the speed of rotation of the shaft 9, transmitted in the example described hereinabove by means of the pressure of a fluid delivered by a pump connected to this shaft, could be transmitted in any other conventional manner, for example as shown in Figure 2 by the force exerted by a centrifugal governor, transmitted by a suitable lever system to the means of controlling the transmission ratio of the change-speed device.

I claim:

1. In an assembly for driving the auxiliary equipment of a gas turbine driven vehicle, in combination, a free-piston gas generator, a main propulsion turbine, an auxiliary turbine, means providing communication between the gas generator and the main and auxiliary turbines including means for providing working-fluid under pressure from the generator to the turbines separately and selectively, a first and a second driven shaft each arranged for driving at least some of the auxiliary equipment, first power transmission means for selectively driving the first shaft from the main turbine and second power transmission means for selectively driving the first shaft from the auxiliary turbine, means for effecting speed-ratio changes between the shafts in dependence on the power output of the gas generator thereby to control the speed of the second shaft as a function of the power output of said gas generator.

2. In an assembly for driving the auxiliary equipment of a gas-turbine driven vehicle, in combination, a gas generator, a main propulsion turbine, an auxiliary turbine, means providing communication between the gas generator and the main and auxiliary turbines including means for providing working-fluid under pressure from the generator to the turbines separately and selectively, a first and a second driven shaft each arranged for driving at least some of the auxiliary equipment, first power transmission means for selectively driving the first shaft from the main turbine and second power transmission means for selectively driving the first shaft from the auxiliary turbine, a variable-speed transmission coupling said first and second shafts and arranged for effecting speed-ratio changes between the shafts in dependence on the power output of the gas generator, proportional control means for controlling the speed-ratio changes of said variable-speed transmission as a function of the pressure level changes of said gas generator thereby to control the speed of the second shaft as a function of the power output of said gas generator.

3. In an assembly for driving the auxiliary equipment of a gas-turbine driven vehicle according to claim 2, in which said proportional control means comprises means responsive to the pressure levels of said gas generator for increasing the speed-ratio of the variable-speed transmission when the power output of the gas generator increases and for decreasing said speed-ratio when the power output is decreased.

4. In an assembly for driving the auxiliary equipment of a gas-turbine driven vehicle according to claim 2, in which said proportional control means comprises means responsive to the pressure levels of said gas generator for increasing the speed-ratio of the variable speed transmission thereby to maintain the speed of the second shaft substantially constant when the gas generator pressure level is maintained constant and the speed of the main turbine is decreased thereby to decrease the speed of the vehicle.

5. In an assembly for driving the auxiliary equipment of a gas-turbine driven vehicle according to claim 2, in which said means for providing working-fluid under pressure to the turbines comprises valve means for cutting-off delivery of working-fluid to the main turbine thereby to stop it and to deliver the working-fluid to the auxiliary turbine, and means providing an atmospheric exhaust for the working-fluid after passing through the auxiliary turbine.

6. In an assembly for driving the auxiliary equipment of a gas-turbine driven vehicle, in combination, a free-piston gas generator, a main propulsion turbine, an auxiliary turbine, means providing communication between the gas generator and the main and auxiliary turbines including means for providing working-fluid under pressure from the generator to the turbines separately and selectively, a first and a second driven shaft each arranged for driving at least some of the auxiliary equipment, first power transmission means for selectively driving the first shaft from the main turbine and second power transmission means for selectively driving the first shaft from the auxiliary turbine, a variable-speed transmission coupling said first and second shafts and arranged for effecting speed-ratio changes between the shafts in dependence on the power output of the gas generator, proportional control means for controlling the speed-ratio changes of said gas generator thereby to control the speed of the second shaft as a function of the power output of said generator, an air compressor for providing air under pressure for braking the vehicle, a third driven shaft, third power transmission means coupling the second and third shafts whereby the third shaft is driven when the said second shaft is driven, and means for driving the compressor when said second shaft is at a standstill.

7. In an assembly for driving the auxiliary equipment of a gas-turbine driven vehicle, in combination, a free-piston gas generator, a main propulsion turbine, an auxiliary turbine, means providing communication between the gas generator and the main and auxiliary turbines including means for providing working-fluid under pressure from the generator to the turbines separately and selectively, a first and a second driven shaft each arranged for driving at least some of the auxiliary equipment, first power transmission means for selectively driving the first shaft from the main turbine and second power transmission means for selectively driving the first shaft from the auxiliary turbine, a variable-speed transmission coupling said first and second shafts and arranged for effecting speed-ratio changes between the shafts in dependence on the power output of the gas generator, proportional control means for controlling the speed-ratio changes of said variable-speed transmission as a function of the pressure level changes of said gas generator thereby to control the speed of the second shaft as a function of the power output of said gas generator, an air compressor for providing air under pressure for braking the vehicle, a third driven shaft, third power transmission means coupling the second and third driven shafts whereby the third shaft is driven by the second shaft, speed-responsive means for disconnecting the third shaft from the third power transmission means when the second shaft slows to a predetermined speed and for connecting it thereto when said predetermined speed is exceeded, and means for selectively driving the compressor when said third shaft is disconnected thereby to provide braking air pressure, even when said vehicle is at a standstill and moving at reduced speeds.

References Cited in the file of this patent

FOREIGN PATENTS

| | | |
|---|---|---|
| 918,852 | France | Nov. 12, 1946 |
| 979,997 | France | Dec. 20, 1950 |
| 244,154 | Switzerland | Mar. 17, 1947 |
| 248,090 | Switzerland | Jan. 16, 1948 |